US007958031B2

(12) United States Patent
Hunt et al.

(10) Patent No.: US 7,958,031 B2
(45) Date of Patent: Jun. 7, 2011

(54) APPARATUS, SYSTEM, AND METHOD FOR AUTOMATED IDENTITY RELATIONSHIP MAINTENANCE

(75) Inventors: Rashmi Hunt, Palo Alto, CA (US); Zeenat Kulkarni, Foster City, CA (US); Jose Angel Martinez Rodriguez, Menlo Park, CA (US); Edwin V. Sapugay, San Mateo, CA (US); Olga Pavlovna Tikhonova, San Francisco, CA (US); Hai Yun Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1163 days.

(21) Appl. No.: 11/301,901

(22) Filed: Dec. 13, 2005

(65) Prior Publication Data

US 2007/0136265 A1    Jun. 14, 2007

(51) Int. Cl.
*G06Q 40/00* (2006.01)
(52) U.S. Cl. .......................................... 705/35; 705/56
(58) Field of Classification Search .................... 705/35, 705/50, 51; 707/151; 717/116; 380/277–279, 380/45
See application file for complete search history.

(56) References Cited

U.S. PATENT DOCUMENTS

| | | | | |
|---|---|---|---|---|
| 6,091,893 | A | 7/2000 | Fintel et al. | 395/500.27 |
| 6,574,635 | B2* | 6/2003 | Stauber et al. | 707/704 |
| 6,609,133 | B2 | 8/2003 | Ng et al. | 707/103 Y |
| 7,032,186 | B1* | 4/2006 | Gasser et al. | 715/853 |
| 2001/0032207 | A1* | 10/2001 | Hartley et al. | 707/102 |
| 2002/0033843 | A1* | 3/2002 | Loos et al. | 345/740 |
| 2002/0035593 | A1* | 3/2002 | Salim et al. | 709/202 |
| 2002/0049603 | A1* | 4/2002 | Mehra et al. | 705/1 |
| 2002/0059566 | A1 | 5/2002 | Delcambre et al. | 717/146 |
| 2002/0161734 | A1* | 10/2002 | Stauber et al. | 707/1 |
| 2002/0173304 | A1* | 11/2002 | Horompoly | 455/426 |
| 2003/0004964 | A1 | 1/2003 | Cameron et al. | 707/103 R |
| 2003/0018694 | A1* | 1/2003 | Chen et al. | 709/200 |
| 2003/0028551 | A1 | 2/2003 | Sutherland | 707/200 |
| 2003/0037173 | A1* | 2/2003 | Pace et al. | 709/310 |
| 2003/0093374 | A1* | 5/2003 | Fenlon et al. | 705/40 |
| 2003/0105884 | A1* | 6/2003 | Upton | 709/318 |
| 2003/0120665 | A1* | 6/2003 | Fox et al. | 707/100 |
| 2003/0149957 | A1* | 8/2003 | Daniels et al. | 717/102 |
| 2003/0177481 | A1* | 9/2003 | Amaru et al. | 717/148 |
| 2005/0015732 | A1 | 1/2005 | Vedula et al. | 715/805 |
| 2005/0075950 | A1* | 4/2005 | Lewis et al. | 705/28 |
| 2005/0120332 | A1 | 6/2005 | Martin et al. | 717/105 |
| 2006/0122961 | A1* | 6/2006 | Kalia et al. | 707/1 |

(Continued)

OTHER PUBLICATIONS

IBM Websphere definitions, published Jun. 2005, 3 pages.*

*Primary Examiner* — James P Trammell
(74) *Attorney, Agent, or Firm* — Kunzler Needham Masey & Thorpe (57) ABSTRACT

An apparatus, system, and method are disclosed for automatically maintaining identity relationships among disparate enterprise information systems. The apparatus comprises a synchronization hub comprising an identity relationship repository, a relationship service module, a consistency module, and an adjustment module. The relationship service is configured to access a target relationship entry using a unique key from a source business object, wherein the source business object is representative of changes made in a source enterprise information system. The various components and modules of the synchronization hub cooperate to determine identity relationships that need updating and to propagate identity relationship changes to one or more destination enterprise information servers.

28 Claims, 6 Drawing Sheets

U.S. PATENT DOCUMENTS

| | | |
|---|---|---|
| 2006/0130038 A1* | 6/2006 | Claussen et al. ............... 717/168 |
| 2006/0256392 A1* | 11/2006 | Van Hoof et al. .............. 358/402 |
| 2006/0282400 A1* | 12/2006 | Kalavacharla et al. ........... 707/1 |
| 2007/0136798 A1* | 6/2007 | Fitzgerald et al. ................. 726/7 |
| 2007/0240047 A1* | 10/2007 | Kosov et al. ................... 715/700 |
| 2008/0270313 A1* | 10/2008 | Cullen et al. .................... 705/80 |

* cited by examiner

APPARATUS, SYSTEM, AND METHOD FOR AUTOMATED IDENTITY RELATIONSHIP MAINTENANCE

BACKGROUND OF THE INVENTION

1. FIELD OF THE INVENTION

This invention relates to maintaining hierarchical data structures and more particularly relates to apparatus, systems, and methods for automatically synchronizing data structures representing similar data objects in separate enterprise information systems.

2. DESCRIPTION OF THE RELATED ART

With the advent of the Information Age, large organizations store voluminous amounts of information in large repositories. Examples of large organizations include a bank, an insurance company, a retail department store chain, a fuel distribution company, a city government entity, a church, a charity organization, and a commercial construction company.

An enterprise such as an auto parts manufacturing company may store customer orders in a production enterprise information systems (EIS). The production EIS may track the customer orders, manufacturing schedules, procurement details for individual components necessary to manufacture ordered parts, and employee scheduling. The same auto parts manufacturing enterprise may have a second EIS, a financial EIS that tracks at employee pay, accounts payable, and the like. The production EIS and the financial EIS serve different purposes. The production EIS may handle the scheduling of manufacturing more efficiently than the financial EIS. Similarly, the financial EIS may handle the payment of salaries and accounts payable more efficiently than the production EIS.

As an enterprise grows and evolves, the enterprise frequently acquires multiple enterprise information systems. The multiple systems may maintain similar data. For example, the auto parts financial EIS may keep a table of employees to track salary information while the production EIS may track employees to handle scheduling functions on an assembly line. Another enterprise may keep two enterprise information systems that track precisely the same data. Such a situation may arise due to the merger of two similar companies that previously had enterprise information systems.

As those of skill in the art understand, redundant data on two systems frequently creates problems. A new hire entered into a financial EIS may not be reflected in a production EIS. An assembly line manager who depends on the production EIS to schedule employees to work on the assembly line may not be able to schedule a new employee to work an assembly line shift until the both the production EIS and the financial EIS both include the new employee in their systems. Similarly, an assembly line manager may be able to enter an employee for work shifts in a production EIS, but the employee may not receive pay unless the employee's information is also entered into the financial EIS.

In the auto parts manufacturer example, owners of multiple EISs desire to synchronize the redundant data stored in distinct enterprise information systems. Synchronization avoids entering the information for a new employee into both systems. When information about the new employee changes in one system, those changes need to be propagated to all other systems that store similar data about the new employee.

Today, synchronization hubs exist to propagate information changes from one EIS to another. However, these synchronization hubs themselves are difficult to maintain and manage. A synchronization hub may identify the need to propagate changes to an employee in one EIS to other systems. However, the software code to propagate the changes can be cumbersome and complex. For example, an employee may have three dependents stored in a financial EIS. However, the dependents may not be stored in the production EIS. If an assembly line manager decides to fire an employee and remove the employee from the production EIS, the synchronization hub must propagate the change to the financial EIS. However, synchronization hubs today may not recognize that the dependents of the fired employee also need to be removed from the financial EIS.

An entry for a dependent may be termed a child entry related to an employee entry which may be termed a parent entry. Even if the dependent is a spouse, the dependent may be termed a child entry in terms of the entry's hierarchical relationship to the employee entry. In some systems, a dependent child entry may relate to a parent entry, a grandparent entry, or beyond. Synchronization hubs do not properly track hierarchical relationships among various child, parent, grandparent, and other related entries, unless an integration code developer provides explicit software instructions for doing so. For each change in one EIS, hierarchically related changes may need to be made in a second EIS. To handle various hierarchically related updates, a database programmer or integration developer may write extensive software code to run in a synchronization hub to anticipate hierarchical relationships and modify those relationships to properly propagate changes made in one EIS to a second EIS.

Owners of enterprise information systems may not know why or may not wish to explain why redundant enterprise information systems exist in their organizations. Even so, those owners know that the redundant data in the plurality of enterprise information systems must be kept in synch as inexpensively as possible.

From the foregoing discussion, it should be apparent that a need exists for an apparatus, system, and method that facilitate the synchronization of redundant data among a plurality of enterprise information servers. Ideally, the apparatus, system, and method must coo properly propagate data object changes as well as update hierarchically related data objects automatically, while avoiding the need for detailed database or integration programming to handle each type of update. Beneficially, such an apparatus, system, and method would automatically synchronize disparate enterprise information systems.

SUMMARY OF THE INVENTION

The present invention has been developed in response to the present state of the art, and in particular, in response to the problems and needs in the art that have not yet been fully solved by currently available systems for synchronizing enterprise information systems. Accordingly, the present invention has been developed to provide an apparatus, system, and method for automated identity relationship maintenance that overcome many or all of the above-discussed shortcomings in the art.

The apparatus to automatically maintain identity relationships is provided with a plurality of modules configured to functionally execute the necessary steps to automatically maintain identity relationships. These modules in the described embodiments include an identity relationship repository, a source adapter, a relationship service module, a consistency module, and an adjustment module. The apparatus may further include a propagation module.

The apparatus, in one embodiment, is configured to store and maintain unique keys related to business objects stored in a source enterprise information system (EIS) and a destination EIS.

The apparatus is further configured, in one embodiment, to search for hierarchically related affected identity relationships within a specified number of hierarchical levels from the target identity relationships. Affected identity relationships are identity relationships that are inconsistent due to changes to the target identity relationship.

In a further embodiment, the apparatus may be configured to maintain composite relationships comprising one or more hierarchical levels.

In a further embodiment, the apparatus may be configured to maintain a generic business object as a hub object to which business objects in EISs are linked as spokes to the generic business object hub.

A system of the present invention is also presented to automatically maintain identity relationships among disparate enterprise information systems. The system may be embodied by two or more enterprise information systems in combination with a synchronization hub. In particular, the system, in one embodiment, includes a source enterprise information system, a destination enterprise information system, and a synchronization hub.

The system may further include a source adapter linking the source enterprise information system and the synchronization hub and a destination adapter linking the synchronization hub and the destination enterprise information system.

A method of the present invention is also presented for automatically maintaining identity relationships. The method in the disclosed embodiments substantially includes the steps necessary to carry out the functions presented above with respect to the operation of the described apparatus and system. In one embodiment, the method includes providing an identity relationship repository; receiving a source business object; accessing a target identity relationship; determining an affected identity relationship hierarchically related to the target relationship; and modifying the affected identity relationship to make the affected identity relationship consistent with the target identity relationship. The method also may include propagating the changes from the source EIS to one or more destination EISs.

In a further embodiment, the method includes maintaining composite relationships of a predetermined depth.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
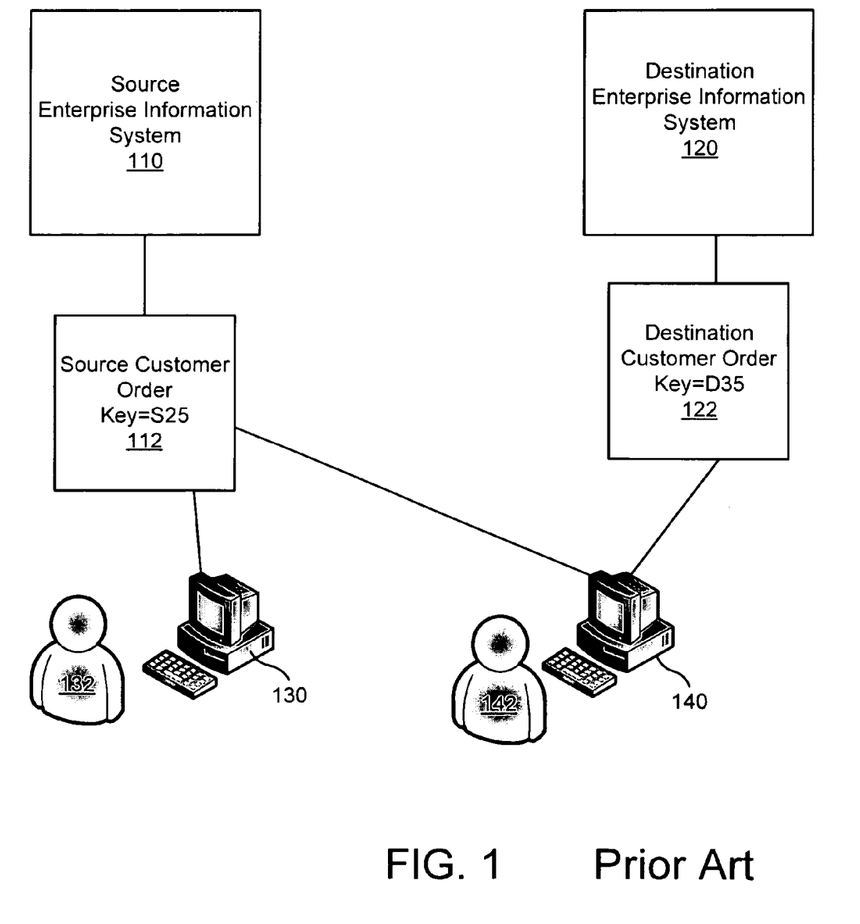
FIG. 1 is a schematic block diagram illustrating a legacy method of updating disparate enterprise information systems.

FIG. 1 depicts a source enterprise information system (EIS) 110 and a destination EIS 120. Large organizations such as banks, insurance companies, retail department store chains, fuel distribution companies, city government entities, churches, charity organizations, commercial construction companies, and the like use enterprise information systems (EISs) to store and manage data. For purposes of this application all of these organizations are termed "enterprises." An enterprise may be a commercial organization, a governmental organization, a charitable organization, a club, or other association that desires to keep and maintain information. The source EIS 110 and destination EIS 120 are disparate EISs meaning that they are distinct EISs. They may track similar information, but they frequently track distinct information as well. Also, they may be built using incompatible software from distinct vendors.

An enterprise information system or EIS comprises one or more information repositories. An information repository may be an information management system, a relational database, a hierarchical database, or the like. An EIS may further comprise computer systems, software, business logic, procedures, data entry systems, controls, forms, check clearing machines, credit card readers, and other types of computer hardware assembled to manage the information in the EIS and the flow of information through the enterprise.

Information or data in the EIS may be stored, accessed, created, updated, modified or deleted. In one sense, access refers to the reading of data from an information repository. However, for purposes of this application, "access" includes all actions that an information repository may perform on data including creating, writing, storing, reading, updating, modifying, copying, transferring, transcribing, translating, merging, deleting, and the like.

In one embodiment, source EIS 110 may track order processing for a clothing mail order house. The source EIS 110 may comprise an information repository for storing information about individual orders, information about individual customers, and information about inventory levels at various regional warehouses. The source EIS 110 includes business logic to compare inventory levels against order trends and to generate inventory replacement orders to anticipate and prevent inventory shortages. The EIS may provide web-based forms to consumers and to order processors for order creation. The system may include logic and hardware to track inventory shipments and so forth.

An order processor 132 may be a human computer operator who receives a customer order over the phone, through email, in person, or by some other means. The order processor 132 may receive information about an order including the customer name, the desired articles of clothing to include in the order and so forth. The order processor 132 uses computer terminal 130 linked to source EIS 110 to create orders and enter those orders into the source EIS 110.

In one embodiment, source EIS 110 creates a source customer order business object 112 for each customer order. Each business object organizes information to be stored in the source EIS 110. A business object is a grouping of data stored in an EIS. In some instances, a business object may further comprise contextual information about the data contained in the business object. For example, a business object may indicate that the contained data has just been created, deleted, or updated in the information repository of an EIS. In figure one, the source customer order 112 is a business object that tracks a single customer order. The business object comprises a unique key, for example S25. The unique key or handle uniquely identifies the source customer order 112 across all source customer orders that source EIS 110 manages.

In one embodiment, destination EIS 120 is a second EIS which may be owned and managed by the same enterprise that owns source EIS 110. Destination EIS 120 may store some information that is duplicative of information stored in source EIS 110. For example, destination EIS 120 stores destination customer orders 122 similar to the source customer orders 112 stored in the source EIS 110.

Many reasons may exist for storing duplicative information in two EISs 110, 120. Two enterprises, each with its own EIS, may merge to form a single enterprise. Merging the two EISs into a single EIS may be cost prohibitive, and the new merged enterprise may choose to maintain both EISs to avoid the cost of conversion. Alternatively, one EIS may serve a distinct purpose from a second EIS. One EIS may track orders while a second EIS may track financial accounting. In this case, the two EISs may not store completely duplicative information, but rather share a limited amount of duplicative information.

Regardless of the reason for maintaining multiple EISs, an enterprise operates more effectively if duplicative information stored in each EIS is synchronized across all of the EISs in the enterprise. For example, source EIS 110 may track customer orders, inventory, shipments, and order processor operators 132. Destination EIS 120 may track financial information related to customer orders as well as wage data, accounts payable and accounts receivable. Each EIS may store information about customer orders and about car individual customers.

In order to keep destination EIS 120 synchronized with source EIS 110, business logic in the source EIS 110 may be configured in a conventional solution to send an email to synchronization operator 142 each time that source EIS 110 creates a new source customer order 112. The email may comprise the customer name, the unique source key associated with the source customer order 112, as well as the particular line items from the source customer order 112.

The synchronization operator 142 may comprise a human operator that processes the email updates. The synchronization operator 142 may create a new destination customer order 122 in destination EIS 120 using computer terminal 140. The destination customer order 122 may comprise the customer name from the source customer order 112 as well as other information from the source customer order 112. The destination customer order may also comprise a unique destination key, for example "D35," that uniquely identifies the destination customer order 122 among all of the destination customer orders stored in the destination EIS 120.

In this manner, the EIS owners may manually synchronize the two EISs 110, 120 each time that a change to one EIS occurs. For purposes of the examples in this application, one EIS is designated as the source EIS 110 while the other is designated as the destination EIS 120. Those of skill in the art will understand that initial changes may be made in any of the EISs owned by an enterprise and propagated to one or more EISs as needed to synchronize duplicative data.

Figure 2A:
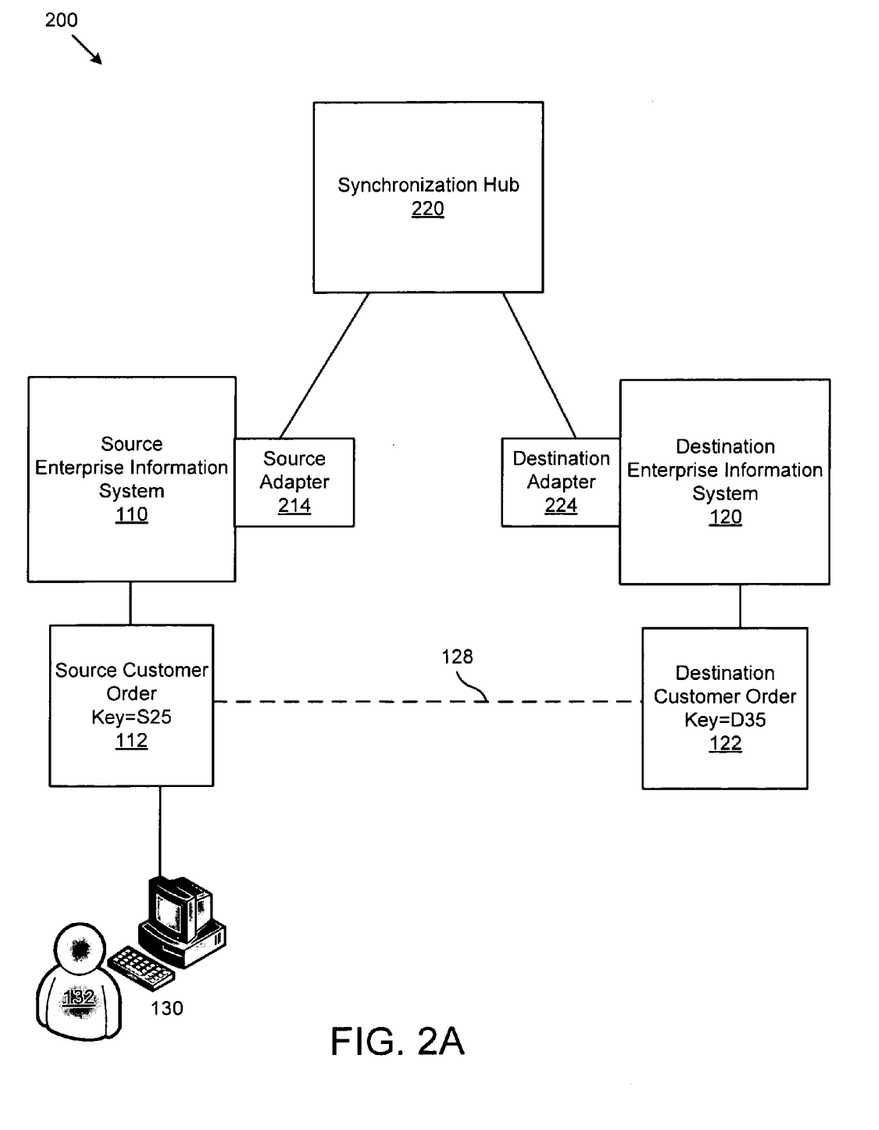
FIG. 2A is a schematic block diagram illustrating an apparatus for automatically updating disparate enterprise information systems in accordance with the present invention.

FIG. 2A is a schematic block diagram of a system 200 configured to automatically synchronize duplicative data in separate EISs in accordance with the present invention. FIG. 2A depicts a system 200 comprising a source EIS 110 and a destination EIS 120. Synchronization hub 220 connects to source EIS 110 through source adapter 214 and to destination EIS 120 through destination adapter 224.

Synchronization hub 220 may comprise software modules configured to recognize changes in a source EIS 110 and propagate those changes to a destination EIS 120. Source adapter 214 may link to the update logic of source EIS 110. Changes to an information repository in source EIS 1O may result in a function call to software modules in source adapter 214. For instance, source EIS 110 may transmit to source adapter 214 the creation of source customer order 112 along with the associated customer name and unique key, for example "S25." In the example, source customer order 112 is a business object contained in the source EIS 110.

The source adapter 214 communicates changes in the source EIS 110, for example, the creation of source customer order 112, to the synchronization hub 220. The synchronization hub 220 may maintain its own information repository that correlates changes to business objects stored in the source EIS 110 with business objects in the destination EIS 120. Synchronization hub 220 selectively propagates changes received from the source adapter 214 to the destination adapter 224. The destination adapter 224 relays propagated changes to the destination EIS 120. For example, the creation of a source customer order 112 with key "S25" is propagated to the destination EIS 120, resulting in the creation of a destination customer order 122 with key "D35." Following the creation of the destination customer order, the destination EIS 120 may return a creation event business object comprising the unique key, for example "D35," that the destination EIS 120 uses to uniquely identify the destination customer order. The destination EIS 120 returns the creation event business object to the destination adapter 224 which in turn sends the creation event business object to the synchronization hub 220.

The synchronization hub 220 maintains identity relationships 128 (indicated by dashed lines) between two or more EISs. An identity relationship captures the fact that certain object instances (e.g. source customer order 112 in source EIS 110) are one and the same (logically equivalent/substantially similar) with respect to instances found in other systems/modeling domains (e.g. destination customer order 122 in destination EIS 120). Thus, an 'identity' relationship captures the notion of an equivalence relationship across disparate object instances found across multiple EISs. Structurally, business object instances in disparate EISs may be considerably different, however, logically, they may both represent the same physical or virtual entity.

An identity relationship 128 may use the unique keys for business objects stored in disparate EISs to logically map a business object in one system to a business object in another system. An identity relationship 128 may track the existence of similar data in two disparate EISs. In the example, the source EIS 110 and the destination EIS 120 maintain the same customer order 112, 122. Each EIS 110, 120, uses a distinct unique key to identify each customer order 112, 122. Any change to the source customer order 112 should be propagated to destination customer order 122, and vice versa.

Composite relationships are related to identity relationships 128. An identity relationship defines an equivalence between two objects in disparate EISs. Normally, the disparate objects are uniquely defined by a key or index in each EIS. For example, an employee record in source EIS 110 may be identified by a unique sixty-four bit employee identifier. No other employee record in source EIS 110 may contain the same employee identifier. The destination EIS 120 may maintain a personnel record using a social security number as the unique identifier. The employee record in the source EIS 110 and the personnel record in the destination EIS 110

A composite relationship defines an equivalence relationship between objects in disparate EISs as well. However, the EIS may not use a unique identifier for all objects in its repository. A 'composite relationship' is a relationship that contains roles that refer to 'composite participants'. Composite participants are, in turn, defined as participants that can only be uniquely identified within the hierarchical context within which they are found. For example, the employee record may maintain a spouse record. The spouse record may not have a unique identifier. However, the spouse record is unique when considered in the hierarchical context within the employee record. The source and destination EISs 110, 120 may maintain spouse records for the employee record and the personnel record respectively. An equivalence relationship between two secondary objects, such as spouse records, that uses a primary object in each EIS to define a unique identifier is termed a composite relationship.

In one embodiment, order processor 132 creates a new source customer order 112 using terminal 130. The source customer order 112 is stored in source EIS 110. The synchronization hub 220 automatically creates a destination customer order 122 in destination EIS 120. The synchronization hub 220 creates, tracks, updates, and maintains the identity relationship between source customer order 112 and destination customer order 122.

Figure 2B:
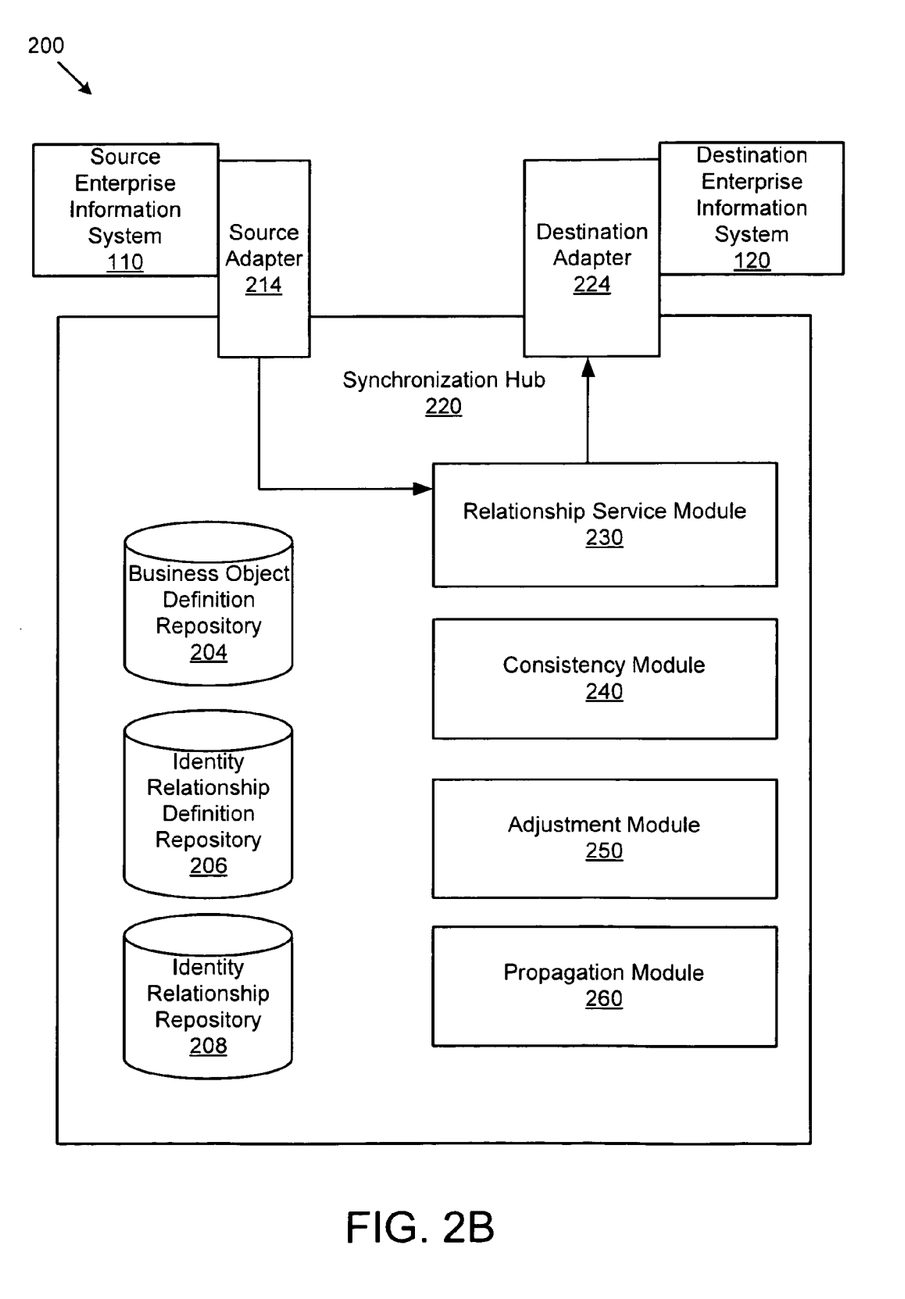
FIG. 2B is a schematic block diagram illustrating one embodiment of a synchronization hub in accordance with the present invention.

FIG. 2B illustrates one embodiment of a system 200 similar to the system 200 of FIG. 2A. System 200 comprises a source EIS 110, a destination EIS 120, and a synchronization hub 220. Source adapter 214 and destination adapter 224 may be part of their respective EISs 110, 120 or may be part of the synchronization hub 220.

Source adapter 214 listens for creation, modification and deletion events in the source EIS 110. Many EISs comprise software exits that can be configured to call a configurable software code segment under specified conditions. For example, some email client programs allow a user to configure rules that are executed when an email message arrives. One rule may be configured to forward a copy of all received email messages to a secondary email address. Such a rule may execute when a new email message arrives. Similarly, the operator of an EIS may configure a software exit to execute specific code segments at the time that certain events take place. The software exit may be scripted code or it may be a compiled, high level language code segment.

In one embodiment of the present invention, the source EIS 110 is configured to call a software exit following the creation, deletion, or modification of a business object stored in the source EIS 110. The source adapter 214 comprises software exits that the source EIS 110 may invoke following the creation, deletion, or modification of business objects in the source EIS 110. The operator of the synchronization hub 220 may use standard software exits or may write and configure custom exits for the source adapter 214 according to the needs and design of the synchronization hub 220.

The synchronization hub 220 manages identity relationships 128 between source EIS 110 and the destination EIS 120. The synchronization hub 220 propagates changes made in the source EIS 110 to the destination EIS 120. Examples of changes that may be propagated include the creation of a purchase order, the modification of a purchase order, the addition of line items to a purchase order, the modification of cost amounts for line items in a purchase order and so forth. Some propagated changes may result in the creation, deletion, or modification of identity relationships maintained by the synchronization hub 220. Other propagated changes may simply pass data value changes from the source EIS 110, through the synchronization hub 220 to the destination EIS 120. For example, changing the cost of a line item for a purchase order may be propagated to the destination EIS 120 resulting in the modification of a destination business object. However, such a change may not require a change to an identity relationship. Synchronization hub 220 may also propagate a change from destination EIS 120 to source EIS 120 or to other EISs.

Synchronization hub 220 comprises various modules configured to manage identity relationships including a business object definition repository 204, an identity relationship definition repository 206, an identity relationship repository 208, a relationship service module 230, a consistency module 240, an adjustment module 250, and a propagation module 260.

The object definition repository 204 stores the definitions for the business objects that the synchronization hub 220 may receive. An object definition defines the fields (also referred to as attributes) that a business object may comprise. Object definitions are typically stored in eXtended markup language (XML), but may be stored in other formats. Object definitions may be referred to as schemas as well.

The identity relationship definition repository 206 stores the definitions for the various identity relationships that the synchronization hub 220 may manage. One identity relationship definition may manage a mapping between purchase orders in the source EIS 110 and purchase authorizations in the destination EIS 120. An identity relationship definition correlates the business object definitions in one EIS that are equivalent to a different business object definition in a second EIS.

The identity relationship repository 208 stores identity relationship instances. The identity relationship repository 208 may comprise a location in memory or a cache. An identity relationship instance maps a source business object instance in the source EIS 110 along with a unique key for the source business object instance to a destination business object instance in the destination EIS 120. An identity relationship instance may comprise a unique key from each EIS that the identity relationship instance contains or joins. Each unique key identifies a business object in the respective EIS.

The relationship service module 230 receives business object changes from the source adapter 214. Business object changes may comprise business object creations, deletions, and modifications. The relationship service module 230 selects business object definitions from the business object definition repository 204 and identity relationship definitions from the identity relationship definition repository 206 in accordance with the business object change received from the source adapter 214. The relationship service module 230 also selects a target identity relationship from the identity relationship repository 208. The target identity relationship relates a business object from the source EIS 110 to a business object in the destination EIS 120. The relationship service module 230 selects the identity relationship from the identity relationship repository 208 based on the business object changes received from the source adapter 214. The target identity relationship references a specific business object referenced in the business object change received from the source EIS 110 through the source adapter 214. The relationship service module 230 updates the target identity relationship in the identity relationship repository 208 according to the business object change.

The consistency module 240 analyzes the identity relationship repository 208 in accordance with the hierarchical definitions defined in the business object definition repository 204 and the identity relationship definition repository 206. Accordingly, the consistency module 240 identifies identity relationships which are inconsistent one with another.

As an example of an inconsistent identity relationship, a parent identity relationship may track purchase orders in two distinct EISs. A child identity relationship may track business objects in the two distinct EISs representing a line item of the purchase order. A child identity relationship may track the relationship between the two line item objects, one object in each EIS. A delete event for the purchase order in the first EIS may cause the parent identity relationship to be removed. However, the child identity relationship may be ignored. The consistency module insures that the child identity relationship as well as the child business objects are deleted. In some EISs, a single business object may track a purchase order and the line items for the purchase order while another EIS may track the purchase order and the line items as separate business objects. The consistency module 240 also tracks inconsistent relationships that may arise when objects are represented with distinct genealogies in distinct EISs.

By performing a consistency check, the consistency module 240 reduces the amount of operator written software segments needed in the source adapter 214 and in software exits in the source adapter 214. The consistency module 240 may identify additional creations, deletions and updates that should be made to keep an identity relationship consistent with a received business object change.

The adjustment module 250 makes changes to the identity relationships in the identity relationship repository 208 to eliminate inconsistencies discovered by the consistency module 240. The adjustment module 250 operates according to the direction of the relationship service module 230 and the consistency module 240. The adjustment module 250 may also create additional business object changes to be propagated to a destination EIS 120.

The propagation module 260, in one embodiment, builds a business object comprising the changes made by the adjustment module 250 and propagates those changes to the destination EIS 120 via the destination adapter 224. Alternatively, the propagation module 260 alters an existing business object to reflect the changes and sends that altered business object to the destination EIS 120. The propagation module 260 operates according to the direction of the relationship service module 230, the consistency module 240, and the adjustment module 260. The propagation module 260 uses the information from the identity relationship repository 208 and may comprise logic to selectively propagate only those changes of which the destination EIS is not aware.

Figure 3:
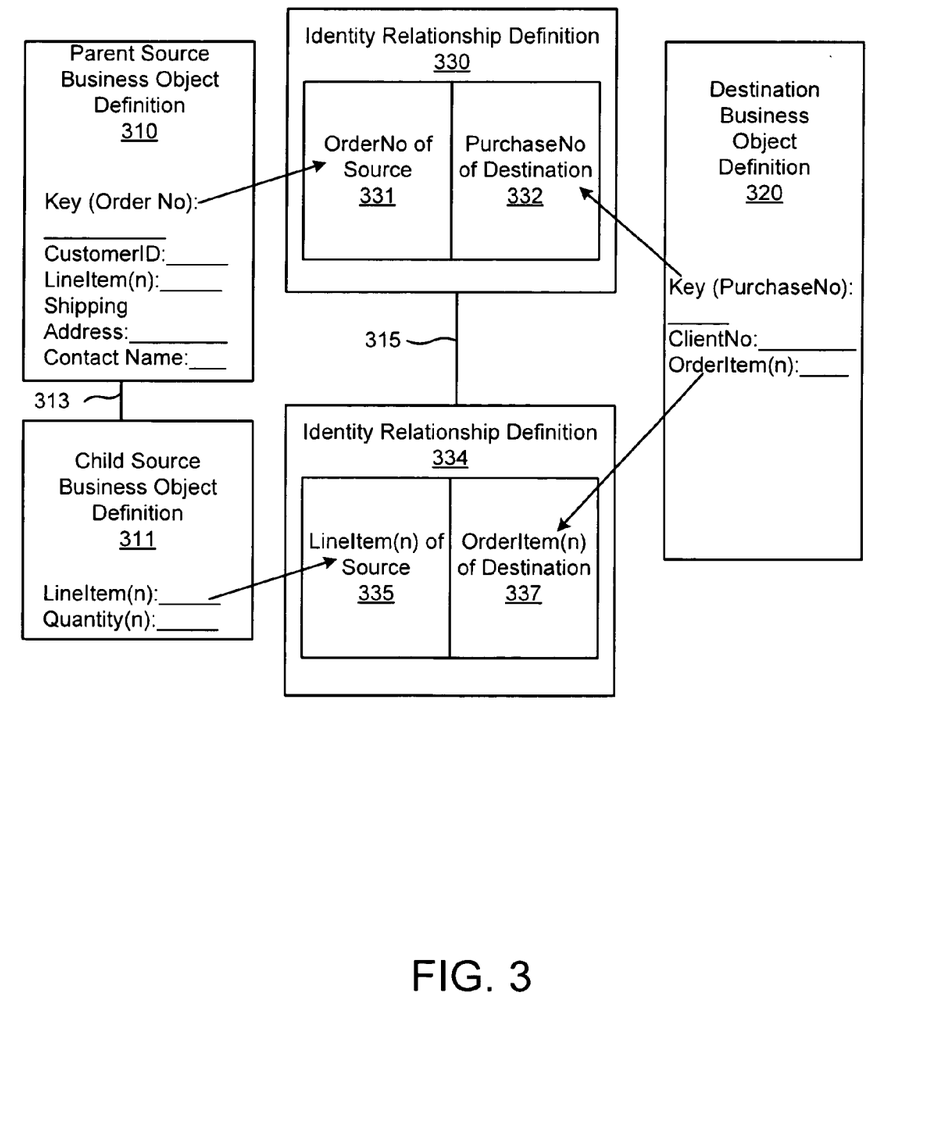
FIG. 3 is a schematic block diagram illustrating various embodiments of business object definitions and identity relationship definitions in accordance with the present invention.

FIG. 3 illustrates examples of three business object definitions and examples of two identity relationship definitions. The definition for a business object defines the fields/attributes associated with the business object. In software terminology, the definition is similar to a class structure while an actual business object is analogous to an object instance of the given software class.

Source customer order 112 (See FIG. 2A) is an example of a business object instance. A business object or a business object instance is an actual instantiation of a business object definition. The business object instance contains actual data values. The source customer order 112 of FIG. 2A contains a data value for a key, namely "S25."

FIG. 3 depicts various object definitions used by the system 200. Object definitions define the fields in business objects and in identity relationships. An object definition does not contain data. An object definition defines fields in which a business object instance stores data values. The key field of the source customer order 112 business object instance (See FIG. 2A) contains a data value of "S25." The parent source business object definition 310 (See FIG. 3) contains a key field, but no value in that field. The illustrated parent source business object 310 may comprise one or more key fields as well as other fields such as, a customer identifier field, a line item array of line item fields, a shipping address field, and a contact name field. The parent source business object definition 310 may be defined in eXtended markup language (XML) or in other formats known to those of skill in the art. The synchronization hub 220 stores definitions such as the parent business object definition 310 in the business object definition repository 206 (See FIG. 2B).

The business object definitions may also store hierarchical relationships between various business objects. For example, FIG. 3 illustrates a child source business object definition 311 comprising a line item field and a quantity field. A parent-child hierarchical relationship 313 connects the parent source business object definition 310 to the child source business object definition. The parent-child child hierarchical relationship 313 may be stored as part of a parent business object definition, as part of a child business object definition, as part of an identity relationship definition, or the like. The parent business object definition 310 offers as an example of a business object definition for a purchase order. The purchase order identifies various fields. However, the purchase order does not identify individual line items for the purchase order. Rather the individual line items are defined in a child source business object definition 311. One purchase order may comprise one line item or a dozen line items. There is a one-to-many relationship between purchase orders and line items. The child source business object definition 311 serves as the definition for all the line items that may be related to a purchase order instance.

In a separate EIS, purchase orders may use a different definitional scheme. For example, a destination EIS 120 may use a destination business object definition 320 comprising a purchase order number, a client number, and an array of order items. The order items in the destination business object definition 320 maybe contained in a single business object definition.

The identity relationship definition 330 relates purchase orders in one EIS to purchase orders in a second EIS. In one embodiment, the OrderNo field of source business object definition 331 is logically linked to the PurchaseNo field of destination business object definition 332. The OrderNo field 331 is a key field in parent source business object definition 310. The PurchaseNo field is a key field in a destination business object definition 320. Preferably, the identity relationship 330 is a definition and not an instance of an identity relationship. The identity relationship definition 330 is stored in the identity relationship definition repository 206.

The identity relationship definition 330 links the definition for a field in a source business object definition 310 to a field in a destination business object definition 320. An additional identity relationship definition 334 relates one line item from the source business object definition 335 to an order item of a destination business object definition 337. Preferably, a hierarchical relationship 315 may connect identity relationship definition 330 to identity relationship definition 334. The hierarchical relationship 315 may be used to locate hierarchically related business object definitions and identity relationship definitions.

Although destination business object definition 320 does not link to a child object (in this example), a second identity relationship definition 334 may link order items in the destination business object definition 320 to line items in the child source business object definition 311. In this manner, identity relationship definitions 330, 334 link fields from one business object definition to another business object definition.

Various tools and helps may assist those of skill in the art such as integration developers to construct business object definitions for source EISs 110 and destination EISs 120. Tools may also assist identity relationship designers to map fields from one business object definition to fields in another business object definition. FIG. 3 illustrates one way in which business object definitions may be linked using hierarchical relationships 313, 315, and identity relationship definitions. Those of skill in the art will understand that various other methods, means, and schemes may be used to relate business objects from one EIS to business objects in a second EIS.

Figure 4:
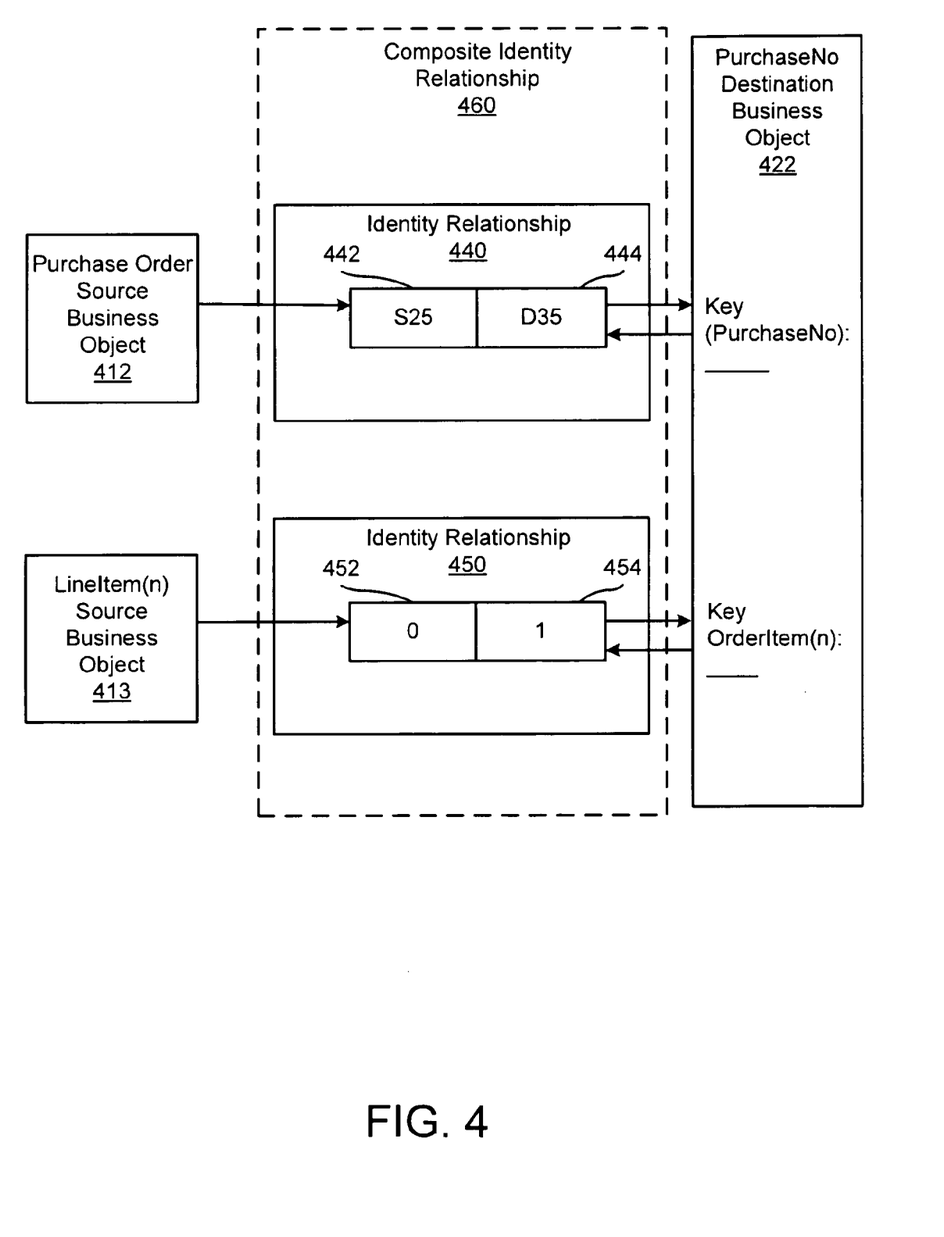
FIG. 4 is a schematic block diagram illustrating various embodiments of business object instances and identity relationship instances in accordance with the present invention.

FIG. 4 illustrates one embodiment of various business object instances and identity relationship instances consistent with the definitions of FIG. 3. FIG. 4 illustrates a purchase order source business object instance 412 comprising a key value of "S25." The purchase order business object 412 comprises a line item source business object 413 whose key is "0." A purchase number destination business object 422 from a second EIS 120 comprises a key "D35." An order item in destination business object 422 comprises a key "1."

An identity relationship instance 440 links the purchase order source business object 412 to the purchase number destination business object 422. The identity relationship 440 links business objects 412, 422 by storing unique keys 442, 444. In addition, identity relationship 440 stores a generic key 446 related to a generic business object managed by the synchronization hub 220.

A relationship 450 relates line items from source and destination business object instances. Relationship 450 stores line item source business object 413 key 452 as well as order item destination business object key 454 and generic key 456. Note that key 452 and key 454 are typically not unique. Thus, relationship 450 is a non-identity relationship. An identity relationship comprises unique keys that uniquely identify business objects. Unique key 442 uniquely identifies the purchase order source business object 412. However, key 452 is not unique.

A purchase order may comprise three line items. In one EIS, the line items may be numbered from zero to two. In a second EIS, the line items may be numbered from one to three. An index of the line item by itself does not uniquely identify a line item among all the line items stored in a system. Rather, a line item is unique only when joined with the purchase order number. Thus, line item 0 of purchase order S25 is unique in one system and is directly related and equivalent to order item number D35. Relationship 450 is a sub-part of composite identity relationship 460 which joins the unique keys of the parent purchase orders with the non-unique keys of the line items to build a composite identity relationship 460 that uniquely links line item source business object 413 to order item destination business object 422.

A composite identity relationship such as composite identity relationship 460 uniquely equates two or more business object fields using a plurality of keys. Typically, the parent key in a composite identity is unique and the child key is not unique unless combined with the parent key. A composite identity relationship may include two hierarchical levels as illustrated in FIG. 4, or a composite identity relationship may include a larger number of hierarchical levels, also referred to as degrees of separation. For example, a child object combined with a parent and a grandparent object may form a composite identity relation of three levels.

Figure 5:
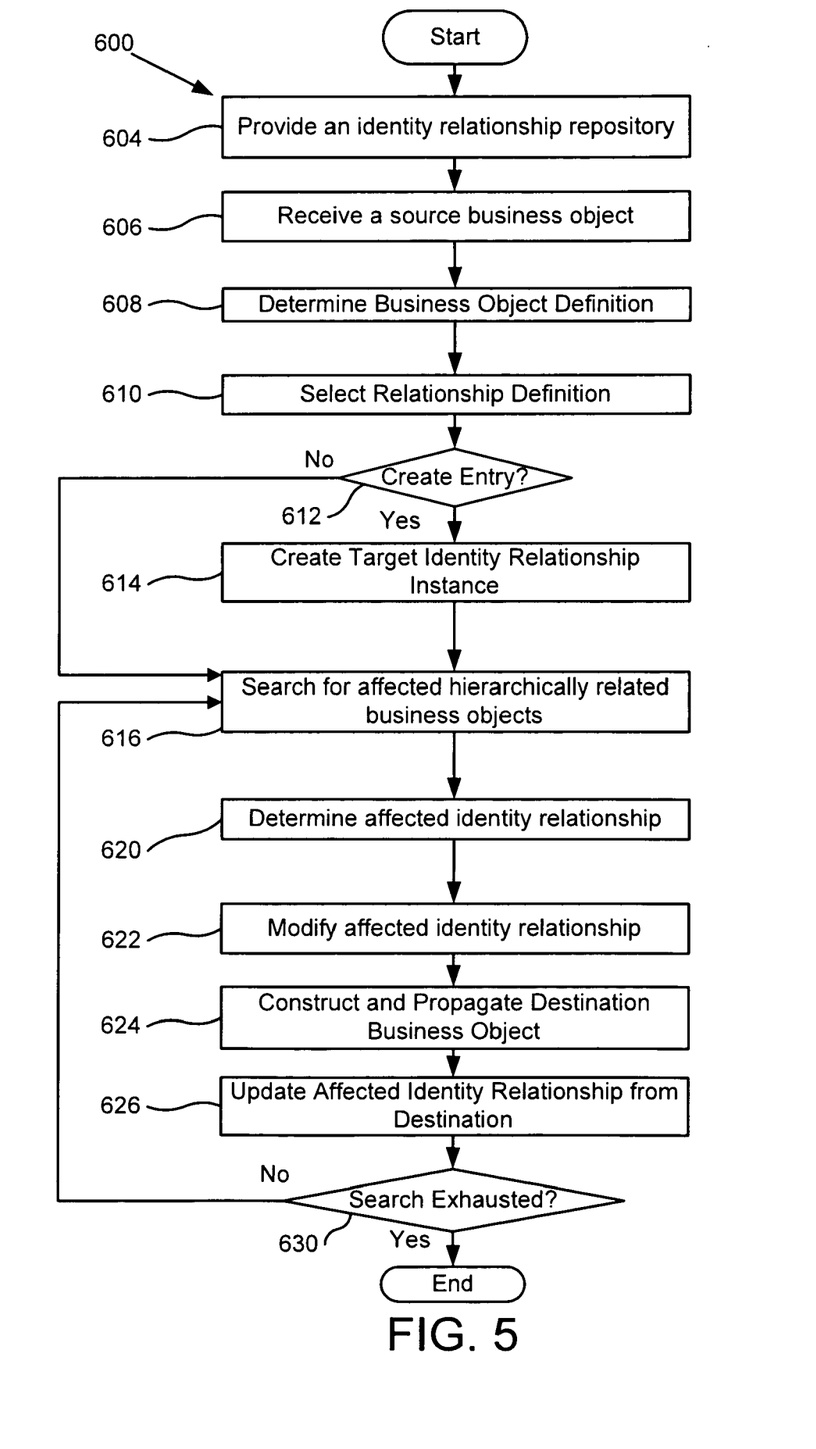
FIG. 5 is a schematic flow chart diagram illustrating one embodiment of a method in accordance with the present invention.

FIG. 5 illustrates one embodiment of a method 600 for automatically updating disparate enterprise information systems in accordance with the present invention.

The method 600 begins by providing 604 an identity relationship repository 208. In addition, the method 600 may provide a business object definition repository 204, and an identity relationship definition repository 206. Providing 604 the various repositories may include providing a various tools to read XML schemas, database schemas, as well as tools to build identity relationship definitions. Tools to build identity relationship definitions allow an operator to link fields from source business object definitions 310, 311 to fields in destination business object definitions 320. Tools may further generate exit software code to initiate the relationship service module 230 to properly process business object changes from source EISs 110 and propagate the changes to destination EISs 120.

Next, the method 600 receives 606 a source business object from a source EIS 110 via a source adapter 214. An operator may configure the source EIS 110 to call exit software in response to a change in the business objects stored in the source EIS 110. The source EIS 110 may pass the changes in the form of a business object or as business object changes. The changes may comprise creations, deletions, or modifications to the source EIS 110. The exit software in the source adapter 214 may process the business object changes.

In one embodiment, an operator writes user code to run as part of the source adapter 214 to explicitly process a source business object 412, 413 received from the source EIS 110. The user code may identify the business object definition 310, 311 and call a software function in the relationship service module 230 named, for example, maintainIdentity ( ), passing the business object 412 and, optionally, the business object definition 310 to the maintainIdentity( ) software function.

In legacy software code, an operator called a maintainSimple( ) software function to indicate to the relationship service module 230 that a particular source business object 310 reflective of a change in the source EIS 110 belonged to an identity relationship. In legacy software code, an operator further called a maintainComposite( ) software function to indicate to the relationship service module 230 that a particular group of source business objects 412, 413 belonged to a composite identity relationship 460. Also, in legacy software code, an operator further called special parent-child software functions to indicate to the relationship service module 230 the hierarchical relationships of various business objects. The maintainComposite( ) code only operates on two-level hierarchies. In other words, maintainComposite( ) only operates on parent-child relationships. The relationship service module 230 of the present invention is not limited to a two-level hierarchy composite relationships.

Advantageously, the logic of the consistency module 240 allows an integration developer to simply make a single call to a maintainIdentity( ) function of the relationship service module 230. The maintainIdentity( ) function call passes the source business object from the source EIS 110 to the relationship service module 230. The maintainIdentity( ) function call uses the definitions from the business object definition repository 204 to identify identity relationships 128, 330, 334, composite relationships 260 and hierarchically related changes that may affect two, three, four, or more hierarchical levels and properly adjusts those relationships.

The relationship service module 230 uses business object definitions 313, 311, 320 from the business object definition repository 204 (See FIG. 2B) and identity relationship definitions 330, 334, from the identity relationship definition repository 206 to ascertain the correct hierarchical relationships among the various business objects 412, 413, 422, 440, 450. Using these definition repositories 204, 206 the relationship service module 230 correctly identifies the identity relationship entries applicable to a specific source business object 412, 413 and updates the correct identity relationship entry in the identity relationship repository 208. In addition, the relationship service module 230 in combination with the consistency module 240, properly identify hierarchical inconsistencies using the definitions from the repositories 204, 206. The relationship service module 230 identifies composite relationships that may span two, three, four, or more hierarchical levels and properly updates equivalent relationships between two EISs.

For example, the deletion of purchase order 412 may cause an update to identity relationship 440. The relationship service module 230 may delete the key stored in identity relationship 440 corresponding to the source business object 412 (in this example the key field is "S25"). The consistency module 240 may determine that relationship 450 is hierarchically related to identity relationship 440. The consistency module 240 may further identify that line item source business object 413 and order items destination business object 422 are no longer consistent with the identity relationships 440, 456. The adjustment module 260 may delete identity relationship 440. The propagation module 260 may in turn send delete messages to the source and destination EISs 110, 120 for line item source business object 413 and the destination business object 422.

In another example, the source EIS may delete the line item source business object 413. Such a change may cause the consistency module 240 to determine that the identity relationship 450 is inconsistent since the order item field of the purchase number destination business object 422 no longer exists. The adjustment module 250 may adjust the identity relationship 450 and the propagation module 260 may send a delete message to the destination EIS 120 resulting in the deletion or clearing of the order item field in the purchase number business object 422.

Advantageously, the maintainIdentity( ) function of the relationship service module 230 cooperates with the consistency module 240 to perform at run-time many functions that previously had to be hard-coded by an integration developer. Consequently, the integration developer need not be concerned with whether a business object 412, 413, 422 has an identity relationship or a composite identity relationship. Instead, the integration developer is shielded from this complexity and the synchronization hub 220 determines what type of relationship exists and how to resolve any inconsistencies.

The relationship service module 230 processes the source business object 412, 413 comprising changes to the source EIS 110 and determines 608 a business object definition 310, 313 for the source business object 412, 413 selected from the business object definition repository 204. In one embodiment, the source business object 412, 413 contains a business object type or name that the relationship service module 230 uses to determine 608 the correct business object definition 310, 313. Alternatively, the relationship service module 230 may select an identity relationship from the identity relationship repository 208 based on a source key value 442, 452 located in the source business object 412, 413. The source business object 412, 413 may comprise an action such as create, update, delete or retrieve. The source business object 412, 413 may further comprise a calling context related to the context in which the business object 412, 413 change was created.

A calling context defines the circumstances under which a business object change is created. For example, source EIS 110 may delete a source business object 412, resulting in a call to the source adapter 214. Such a calling context may be called "event delivery," specifying that a triggered event caused the creation of the source business object 412, 413. In addition, the source business object action in this case is "delete."

In another instance, the source EIS 110 may request information of the synchronization hub using an "access request" calling context and a "retrieve" action. Additional calling contexts may further include "access response" for business objects created by the synchronization hub 220 and propagated to an EIS 110, 120 in response to an access request.

Using the determined business object definition, the relationship service module 230 selects 610 an identity relationship definition 330 from the identity relationship definition repository 206. The identity relationship definition 330 relates the source business object definition 310 to one or more destination business object definitions 320.

The relationship service module 230 further determines 612 if an identity relationship instance 440 exists for the source business object based on the selected identity relationship definition 330. The identity relationship instance directly related to a new source business object 412 processed by the relationship service module 230 is termed a target identity relationship. For example, if the source EIS 110 deletes parent source business object 412, the identity relationship 440 comprising the source key 442 of "S25" is the target identity relationship. The target identity relationship comprises the source key value 442 contained in the source business object 412.

Initially, the relationship service module 230 attempts to locate the target identity relationship that directly relates to the incoming source business object 412. In some instances, the source business object 412 comprises a create action in which case the relationship service module 230 likely does not locate a source target identity relationship instance 440 in the identity relationship repository 208 having the same source key value 442. In other cases, the source business object 412 comprises an updated action or a retrieve action. In these cases, the relationship service module 230 likely does find a target identity relationship instance 440.

If no target identity relationship instance 440 exists, the relationship service module 230 creates 614 a target identity relationship instance 440 based on a selected identity relationship definition 310 and comprising a source key value 442 from the source business object 310. If an identity relationship instance 440 exists, the relationship service module 230 updates the existing target identity relationship 440 with the key value 442 from the source business object 412.

The source business object 412 comprises information about a change to a business object in the source EIS 110. The source business object 412 may comprise key values that relate to a specific target identity relationship 440 from the identity relationship repository 208. The relationship service module 230 creates 614 or modifies the target identity relationship instance 440 to reflect the values from the source business object 412.

Once the target identity relationship entry 440 has been created, deleted, or modified according to the values in the source business object 412, the identity relationship repository 208 may be inconsistent. For example, the deletion of a purchase order source business object 412 (See FIG. 4) may leave a line item child source business object 413 without a parent. The consistency module 240 searches 616 the identity relationship repository 208 for identity relationship entries that are inconsistent as a result of a changes in the source business object. For example, the deletion of a purchase order 412 may necessitate the deletion of the line items 413 related to the purchase order.

The consistency module 240 uses the definitions from the business object definition repository 204 and the identity relationship definition repository 206 as well as the entries in the identity relationship repository 208 to determine 620 an affected identity relationship instance 450. An affected identity relationship instance 450 is one that is made inconsistent as a result of changes in a source business object 412 from a source EIS 110. In searching for, and determining, an affected identity relationship, the consistency module 240 searches for hierarchically related identity relationships. For example, identity relationship 450 is hierarchically related to identity relationship 440. Hierarchically related identity relationships 440, 450 include identity relationships related through parent-child relationships, sibling relationships, and combinations of parent-child and sibling relationships.

Hierarchically related identity relationships may be separated by one level as in a parent-child relationships or several levels as for example in a great-grandparent—great-grandchild relationship. Hierarchically related relationships may also be calculated in terms of degrees of separation. For example, a parent child relationship has one degree of separation. A grandparent-grandchild relationship has two degrees of separation. Other degrees of separation may be identified that do not follow traditional genealogy naming.

In searching for an affected identity relationship, the synchronization hub 220 may be configured to search for all inconsistent relationships or, alternatively, may be configured to search for inconsistent relationships within a specified number of degrees of separation, for example four.

A target identity relationship entry is an identity relationship changed as a direct result of a source business object change received from the source EIS 110. An affected identity relationship entry is an identity relationship that is no longer consistent with the other identity relationship entries due to a change to the target identity relationship entry. For example, source business object 412 directly relates to target identity relationship 440. Additionally, the deletion of identity relationship 440 may cause affected identity relationship 450 to be inconsistent with the other identity relationships in the identity relationship repository 208.

Once the consistency module 240 determines 620 an affected identity relationship 450, the adjustment module 250 modifies 622 the affected identity relationship 450 to make the affected identity relationship consistent with the target identity relationship 440. The adjustment module 250 may delete an inconsistent entry, create a new entry, or modify an existing entry in order to make the affected identity relationship entry consistent with the target identity relationship entry. In the example from FIG. 4, the adjustment module 250 may delete affected identity relationship 450 in response to the deletion of the target identity relationship 440 and the resulting inconsistency in the identity relationship repository 208.

In one embodiment, the propagation module 260 may construct 624 a destination business object 422 comprising the changes made to the affected relationship entry and propagate 624 the destination business object 422 to the destination EIS 120. The destination business object 422 may comprise an action and context similar to the source business object 412. The propagation module 260 propagates the destination business object 422 to the destination EIS 120 via the destination adapter 224.

In those cases in which the destination EIS 120 creates a new business object in its own information repository, the destination adapter 224 or some other mechanism may capture the destination unique key 444, 454 (See FIG. 4) used by the destination EIS 120 for the new destination business object and return the destination unique key 444, 454 to the synchronization hub 220. The relationship service module 230 receives the destination unique key 444 and updates 626 the identity relationships 440, 450 related to the destination business object 422 with the new destination unique key 444, 454.

The consistency module continues the search for affected identity relationship entries until all identity relationship entries have been searched or until a predetermined number of degrees of separation have been searched. Once the search is exhausted 630, the consistency module 240 completes processing.

The synchronization hub 220 maintains identity relationships 128 among a plurality of enterprise information servers. The hub 220 maintains a repository of identity relationships 208 that identify equivalent database fields in each EIS. As updates in business objects stored in one EIS 110 are made, the hub 220 propagates those updates to one or more destination EISs 120. The synchronization hub 220 may maintain a group of generic entries that act as hub entries for each identity relationship. In addition, the hub 220, may link a plurality of spoke entries to each hub entry and propagate changes from one spoke entry to linked destination spoke entries. Using a hub and spoke star mapping of linked identity relationships may improve scalability of the propagation of identity relationship changes.

In some instances, a change to a target identity relationship makes an affected identity relationship inconsistent with the target identity relationship. In such an instance, the hub 220 automatically identifies the affected identity relationship without explicit software can instructions and acts to remove any inconsistencies. The hub 220 also propagates changes to the affected identity relationship to linked spoke EISs or destination EISs 120.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automatically maintaining identity relationships, the method comprising:
   providing one or more identity relationship entries that map a source business object having a unique source key in a source enterprise information system (EIS) to a destination business object having a unique destination key in a destination EIS that is separate from the source EIS;
   detecting a change in the source business object in the source EIS, wherein the change is one of a deletion, a creation, and an update;
   searching for a target identity relationship in response to detecting the change in the source business object, wherein the target identity relationship is an identity relationship entry comprising the unique source key of the source business object and that relates the source business object to the destination business object;
   accessing the target identity relationship and updating the target identity relationship in response to finding the target identity relationship;
   searching for one or more affected identity relationships that are inconsistent as a result of the change in the source EIS, that are hierarchically related to the target identity relationship, and that comprise at least one non-unique key;
   modifying the one or more affected identity relationships to make the one or more affected identity relationships consistent with the target identity relationship and the source business object in the source EIS in response to finding the one or more affected identity relationships;
   constructing a business object comprising changes made to the one or more affected identity relationships and the one or more affected target identity relationships; and
   propagating the business object comprising changes to the destination EIS.

2. The method of claim 1 wherein the source key comprises a unique handle to access a data object in the source EIS.

3. The method of claim 1 further comprising:
   receiving an updated destination business object from the destination EIS, wherein the updated destination business object comprises a destination key representative of a change in the destination EIS, in response to the destination EIS implementing the changes in the business object comprising changes; and
   modifying the one or more affected identity relationships to include the destination key from the updated destination business object.

4. The method of claim 1 wherein the target identity relationship relates the source business object associated with the source EIS to the destination business object through an object definition for the source business object.

5. The method of claim 3 wherein the target identity relationship relates a field in a definition for the source business object to a field in a definition for the updated destination business object.

6. The method of claim 3 further comprising modifying the destination EIS to synchronize the destination EIS with the source EIS.

7. The method of claim 1, wherein searching for the one or more affected identity relationships hierarchically related to the target identity relationship comprises:
   determining a target business object definition associated with the target identity relationship;
   selecting an affected business object definition linked to the target business object definition; and
   determining the affected identity relationship associated with the affected business object definition.

8. The method of claim 7, wherein selecting the affected business object definition linked to the target business object definition is limited to business object definitions linked to the target business object by no more than a predetermined number of hierarchical levels.

9. An apparatus configured to automatically maintain an identity relationship repository for synchronizing a source enterprise information system (EIS) and at least one destination EIS, the apparatus comprising:
   the identity relationship repository comprising one or more identity relationships that map a source business object having a unique source key in the source to a destination business object having a unique destination key in the at least one destination EIS that is separate from the source EIS;
   a source adapter configured to detect a change in the source business object occurring in the source EIS, wherein the change in the source EIS comprises one of a deletion, a creation, and an update;
   a relationship service module configured to search for a target identity relationship in response to the source adapter detecting the change in the source business object, wherein the target identity relationship is an identity relationship entry comprising the unique source key of the source business object and relates the source business object to the destination business object, the relationship service module further configured to access the target identity relationship and update the target identity relationship in response to finding the target identity relationship;
   a consistency module configured to search for one or more affected identity relationships that are inconsistent as a result of the change in the source EIS, that are hierarchically related to the target identity relationship, and that comprise at least one non-unique key;
   an adjustment module configured to modify the one or more affected identity relationships to make the one or more affected identity relationships consistent with the target identity relationship and the source business object in the source EIS in response to the consistency module finding one or more affected identity relationships; and
   a propagation module configured to construct a business object comprising changes made to the one or more affected identity relationships and to propagate the business object comprising the modification to the one or more affected identity relationships to at least one destination EIS.

10. The apparatus of claim 9 further comprising a destination adapter configured to receive an updated destination business object comprising a destination key from the at least one destination EIS.

11. The apparatus of claim 10 wherein the source key comprises a unique handle to access a source data object in the source EIS and the destination key comprises a unique handle to access a destination data object in the at least one destination EIS.

12. The apparatus of claim 9, further comprising:
   a business object definition repository comprising business object definitions in the source EIS;
   an identity relationship definition repository comprising identity relationship definitions; and
   the consistency module further configured to access the business object definitions and the identity relationship definitions to select one or more affected identity relationships that are hierarchically related to the target identity relationship.

13. The apparatus of claim 12, wherein the consistency module is further configured to select the one or more affected identity relationships that are hierarchically related to the target identity relationship by at most a predetermined number of degrees of separation.

14. The apparatus of claim 10 wherein the source adapter and the destination adapter are configured to call a MaintainIdentity software module and wherein the relationship service module is configured to selectively call a MaintainSimple software module and a MaintainComposite software module in accordance with the source business object and the destination business object.

15. The apparatus of claim 9, wherein the modification of the one or more affected identity relationships comprises updating the one or more affected identity relationships with the source key from the source business object.

16. The apparatus of claim 9 wherein the one or more identity relationships establish a hub and spoke mapping in which fields in business objects of disparate enterprise information systems represent spokes and a generic business object represents the hub.

17. The apparatus of claim 16 wherein the propagation of the business object comprising changes comprises propagating the business object comprising changes to a plurality of destination enterprise information systems.

18. A method for automatically maintaining identity relationships, the method comprising:
   encapsulating a "MaintainSimple" function call and a "MaintainComposite" function call under a single function call;
   publishing an application programming interface to access the function call from a set of external source code; and
   invoking the function call in response to receiving a source business object from a source enterprise information system (EIS) and detecting a change in the source business object in the source EIS, wherein the change is one of a deletion, a creation, and an update, such that during run-time a series of actions occur, the series of actions comprising:
      accessing a repository of identity relationship entries that map source business objects having a unique source key in a EIS to destination business objects having a unique destination key in a destination EIS that is separate from the source EIS;

searching for a target identity relationship in response to detecting the change in the source business object, wherein the target identity relationship is an identity relationship entry comprising the unique source key of the source business object and that relates the source business object to the destination business object;

accessing the target identity relationship and updating the target identity relationship in response to finding the target identity relationship;

searching for an affected identity relationship that is inconsistent as a result of the change in the source EIS, that is hierarchically related to the target identity relationship, and that comprises at least one non-unique key, wherein the affected identity relationship is inconsistent as a result of the update of the target identity relationship;

modifying the affected identity relationship to make the affected identity relationship consistent with the target identity relationship and the source business object in the source EIS in response to finding the affected identify relationship; and constructing a business object comprising changes made to the affected identity relationship and propagating the business object comprising changes to the destination EIS.

19. The method of claim 18, the series of actions further comprising:

receiving an updated destination business object from the destination EIS wherein the updated destination business object comprises a destination key representative of a change in the destination EIS; and modifying the affected identity relationship to include the destination key from the updated destination business object.

20. The method of claim 19 wherein the target identity relationship relates a field in a definition for the source business object to a field in a definition for the updated destination business object.

21. The method of claim 19 further comprising modifying the destination EIS to synchronize the destination EIS with the source EIS.

22. The method of claim 18, wherein finding an affected hierarchically related identity relationship comprises:

determining a target business object definition associated with the target identity relationship;

selecting an affected business object definition linked to the target business object definition; and determining the affected identity relationship associated with the affected business object definition.

23. The method of claim 22, wherein selecting the affected business object definition linked to the target business object definition is limited to business object definitions linked to the target business object by no more than a predetermined number of adjacent hierarchical levels.

24. A computer program product for automatically maintaining identity relationships, the computer program product stored on a computer memory and configured to:

provide one or more identity relationship entries that map a source business object having a unique source key in a source enterprise information system (EIS) to a destination business object having a unique destination key in a destination EIS that is separate from the source EIS;

detect a change in the source business object in the source EIS, wherein the change is one of a deletion, a creation, and an update;

search for a target identity relationship in response to detecting the change in the source business object, wherein the target identity relationship is an identity relationship entry comprising the unique source key of the source business object and that relates the source business object to the destination business object;

access the target identity relationship and updating the target identity relationship in response to finding the target identity relationship;

search for one or more affected identity relationships that are inconsistent as a result of the change in the source EIS, that are hierarchically related to the target identity relationship, and that comprise at least one non-unique key;

modify the one or more affected identity relationships to make the one or more affected identity relationships consistent with the target identity relationship and the source business object in the source EIS in response to finding the one or more affected identity relationships;

construct a business object comprising changes made to the one or more affected identity relationships and the one or more affected target identity relationships; and propagate the business object comprising changes to the destination EIS.

25. The computer program product of claim 24, wherein the computer program product is further configured to:

receive an updated destination business object from the destination EIS, wherein the updated destination business object comprises a destination key representative of a change in the destination EIS, in response to the destination EIS implementing the changes in the business object comprising changes; and modify the one or more affected identity relationships to include the destination key from the updated destination business object.

26. The computer program product of claim 24, wherein the target identity relationship relates the source business object associated with the source EIS to the destination business object through an object definition for the source business object.

27. The computer program product of claim 24, wherein the target identity relationship relates a field in a definition for the source business object to a field in a definition for an updated destination business object.

28. The computer program product of claim 24, wherein searching for the one or more affected identity relationships hierarchically related to the target identity relationship comprises:

determining a target business object definition associated with the target identity relationship;

selecting an affected business object definition linked to the target business object definition; and determining the affected identity relationship associated with the affected business object definition.

* * * * *